US009146051B2

(12) United States Patent
Kamin et al.

(10) Patent No.: US 9,146,051 B2
(45) Date of Patent: Sep. 29, 2015

(54) MULTIFUNCTIONAL COOLERS (71) Applicants: John Y. Kamin, Taylors, SC (US); Steve C. Taylor, Greenville, SC (US)

(72) Inventors: John Y. Kamin, Taylors, SC (US); Steve C. Taylor, Greenville, SC (US)

( * ) Notice: Subject to any disclaimer, the term of this patent is extended or adjusted under 35 U.S.C. 154(b) by 91 days.

(21) Appl. No.: 13/972,824

(22) Filed: Aug. 21, 2013

(65) Prior Publication Data

US 2014/0054299 A1 Feb. 27, 2014

Related U.S. Application Data (60) Provisional application No. 61/691,730, filed on Aug. 21, 2012.

(51) Int. Cl.
| | | |
|---|---|---|
| *F25D 23/00* | (2006.01) | |
| *A45C 11/20* | (2006.01) | |
| *A45C 9/00* | (2006.01) | |
| *A45C 15/06* | (2006.01) | |
| *B60R 9/06* | (2006.01) | |
| *A47B 3/10* | (2006.01) | |
| *A47B 31/06* | (2006.01) | |

(52) U.S. Cl.
CPC . *F25D 23/00* (2013.01); *A45C 9/00* (2013.01); *A45C 11/20* (2013.01); *A45C 15/06* (2013.01); *B60R 9/065* (2013.01); *A45B 2200/1063* (2013.01); *A47B 3/10* (2013.01); *A47B 31/06* (2013.01)

(58) Field of Classification Search
CPC .......... A45C 11/20; F25D 23/00; B60R 9/065
USPC .......................... 224/519, 522, 524–527, 531; 220/592.2, 592.23, 592.15
See application file for complete search history.

(56) References Cited

U.S. PATENT DOCUMENTS

| | | | | | |
|---|---|---|---|---|---|
| 3,543,890 | A | * | 12/1970 | Criswell | 190/12 R |
| 3,572,054 | A | * | 3/1971 | Curcio | 62/390 |
| 4,577,475 | A | * | 3/1986 | Herrera | 62/457.1 |
| 4,844,528 | A | * | 7/1989 | Johnson | 296/37.1 |
| 5,110,193 | A | * | 5/1992 | McClenning | 312/282 |
| 5,456,357 | A | * | 10/1995 | Wenner et al. | 206/372 |
| 5,459,648 | A | * | 10/1995 | Courtney | 362/154 |
| 5,544,799 | A | * | 8/1996 | Didlake | 224/502 |
| 5,601,206 | A | * | 2/1997 | Haas et al. | 220/527 |
| 5,713,468 | A | * | 2/1998 | Streichan | 206/372 |
| 5,816,433 | A | * | 10/1998 | Higgins | 220/534 |
| 6,216,488 | B1 | * | 4/2001 | Rucker | 62/457.7 |
| 6,357,252 | B1 | * | 3/2002 | Rand | 62/457.7 |
| 6,802,441 | B1 | * | 10/2004 | DuRant et al. | 224/513 |
| 8,181,811 | B1 | * | 5/2012 | Blake | 220/475 |
| 8,256,156 | B1 | * | 9/2012 | Burgoyne, Jr. | 43/54.1 |
| 8,763,848 | B2 | * | 7/2014 | Carey | 220/592.2 |

(Continued)

*Primary Examiner* — Brian D Nash
(74) *Attorney, Agent, or Firm* — J. Bennett Mullinax, LLC (57) ABSTRACT Multifunctional coolers are provided herein. A multifunctional cooler can include a cooler body having a top, a bottom, a first end wall, a second end wall, a front side wall, and a back side wall. The body can have at least two or more separate, isolated and thermally insulated drawer cavities positioned within the body with each drawer cavity having an opening on the front side wall. The multifunctional cooler can also include a drawer removably insertable into each drawer cavity in the front side wall, each drawer being movable from an open position to a closed position. In some embodiments, the multifunctional cooler can include at least one foldable tabletop extension foldably secured to the top of the cooler body that can be movable between a closed position and an unfolded position.

20 Claims, 5 Drawing Sheets

(56) References Cited

U.S. PATENT DOCUMENTS

| | | | |
|---|---|---|---|
| 8,844,756 B2 * | 9/2014 | Beyburg | 220/592.2 |
| 2003/0038138 A1 * | 2/2003 | Komurke | 220/592.2 |
| 2005/0103044 A1 * | 5/2005 | Mogil et al. | 62/457.7 |
| 2006/0065665 A1 * | 3/2006 | Swartfager et al. | 220/592.2 |
| 2006/0188418 A1 * | 8/2006 | Park et al. | 422/292 |
| 2006/0279052 A1 * | 12/2006 | Marmah et al. | 280/47.26 |
| 2008/0245095 A1 * | 10/2008 | Schlipman et al. | 62/457.1 |
| 2012/0273505 A1 * | 11/2012 | Bose | 220/592.16 |
| 2012/0292327 A1 * | 11/2012 | Carey | 220/592.2 |

\* cited by examiner

MULTIFUNCTIONAL COOLERS

RELATED APPLICATION

The presently disclosed subject matter claims the benefit of U.S. Provisional Patent Application Ser. No. 61/691,730, filed Aug. 21, 2012, the disclosure of which is incorporated herein by reference in its entirety.

TECHNICAL FIELD

The subject matter disclosed herein relates generally to multifunctional coolers and related methods. More specifically, the subject matter disclosed herein relates to multifunctional coolers that comprise a body having two or more separate, isolated and thermally insulated compartments in a body side in which drawers that can be opened and closed reside and foldable tabletop extensions extendable from a top portion of the body.

BACKGROUND

There are many coolers and cargo boxes available on the market that offer storage space for food and drink or for clothing and other items, but none offer multiple and separate (isolated) compartments to allow the storage of multiple items that cannot be stored together. Furthermore, once you get to your destination, which may be an outdoor location, such as a tailgate party, camping site, promotional event, etc. you will need a table to spread out and serve your items. The subject matter disclosed herein includes a foldable table built-in so that carrying an additional and separate table in not necessary thereby saving space and weight. It also includes hooks for hanging various items, beverage holders and a tube for holding an umbrella to protect the items on the tabletop from sun and rain.

SUMMARY

It is an object of the present disclosure to provide transportable containers, such as multifunctional coolers. Specifically, the subject matter disclosed herein relates to multifunctional coolers that comprise a body having two or more separate, isolated and thermally insulated compartments in a body side in which drawers that can be opened and closed reside and, in some embodiments, foldable tabletop extensions can extend from a top portion of the body. For example, in some embodiments, the present disclosure provides a hitch-mounted cooler that can operate as a cargo box, storage unit and serving station.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Repeat use of reference characters in the present specification and drawings is intended to represent the same or analogous features or elements of the subject matter disclosed herein.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

In the present disclosure, when a feature, element, component, region, layer and/or section is being described as "top", "bottom," "front," "rear," "side," etc., it should be understood that such terms are relative and not absolute. Thus, something that is described with the adjective of "top" may also be considered on a side or a bottom depending on the orientation of the larger subject being described. Additionally, when a feature, element, component, region, layer and/or section is being described as "under," "on," or "over" another feature, element, component, region, layer and/or section, it is to be understood that the features, elements, components, regions, layers and/or sections can either be directly contacting each other or have another feature, element, component, region, layer and/or section between them, unless expressly stated to the contrary. Similarly, directional movement, such as "back and forth," "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a cooler and are not intended to limit the scope of the subject matter disclosed herein.

"Hitch-mount" as used herein is broadly defined to mean any mount that can be inserted into a hitch attached to a vehicle and can include, but is not limited to, ball mounts, hitch balls, mounts having platforms, drawbars, rack mounts, bike rack mounts, or other like attachments.

The multifunctional cooler disclosed herein can also serve as a cooler and a serving system and can comprise drawers that can reside in a cooler body that has separate, isolated and thermally insulated internal compartments, or cavities, for the drawers. The drawers can have drawer wells that provide internal space for holding wet items, such as food and drink packed in ice in compartment or cavity of the cooler body and dry items, such as clothing in the other compartment or cavity of the cooler body without the risk of cross-contamination. The top of the multifunctional cooler can include one or more folding tabletop extensions which unfold to form a long table on which food items can be served. The tabletop extensions can include beverage holders and hooks for hanging towels, disposal bags, and cooking and serving implements among other items. Once unfolded the tabletop extension align with a top portion of the cooler body to form a table, which can again be used to serve food and drink or may also be used for promotional activities among other activities. The multifunctional cooler also includes a tube that may be used to hold a beach-style umbrella for protecting the items on the tabletop from sun and rain. In some embodiments, the multifunctional cooler can be detachably secured to a platform of a hitch-mount that can be attached to a motor vehicle.

Figure 1:
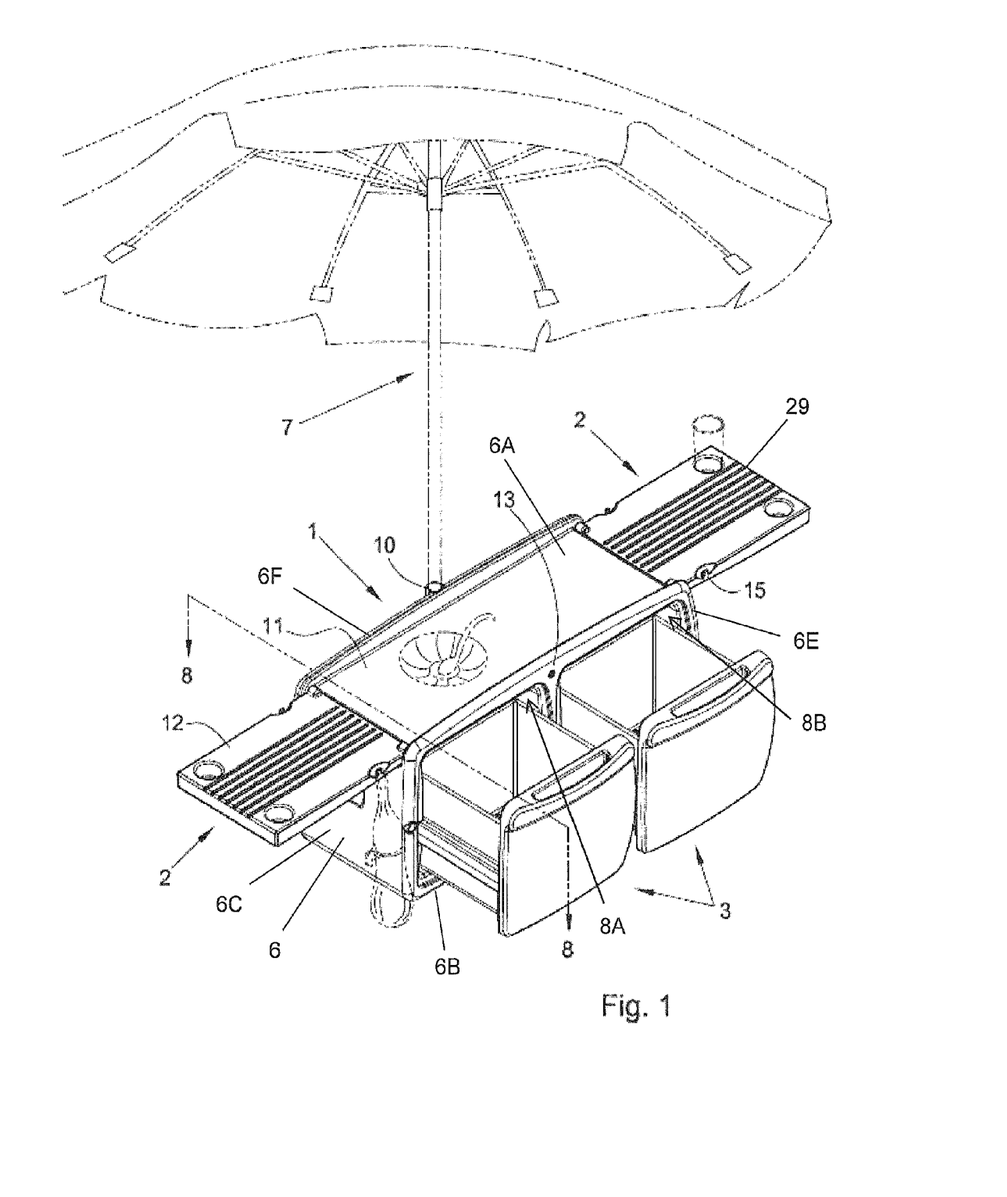
FIG. 1 illustrates a front perspective view of an embodiment of a multifunctional cooler with embodiments of tabletop extensions unfolded according to the subject matter disclosed herein.
Figure 2:
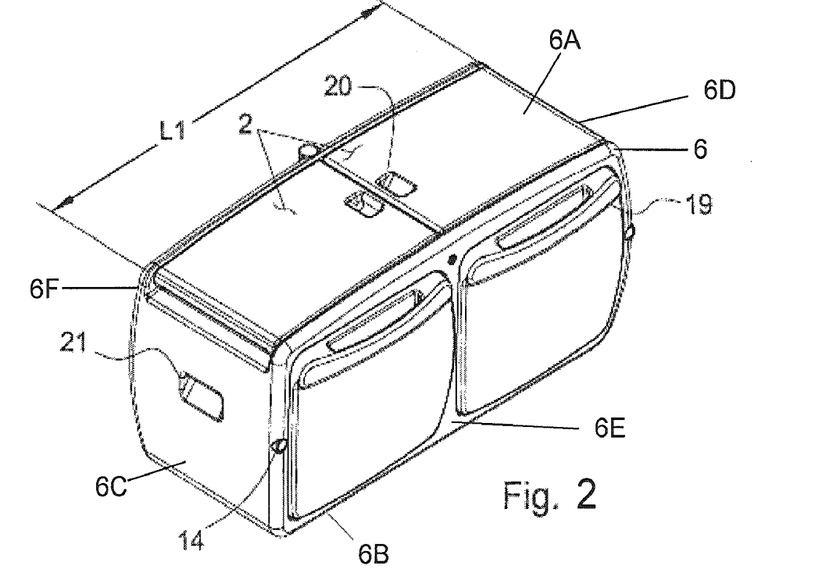
FIG. 2 illustrates a perspective view of the embodiment of the multifunctional cooler according to FIG. 1 with the embodiments of tabletop extensions folded in a closed position.
Figure 4:
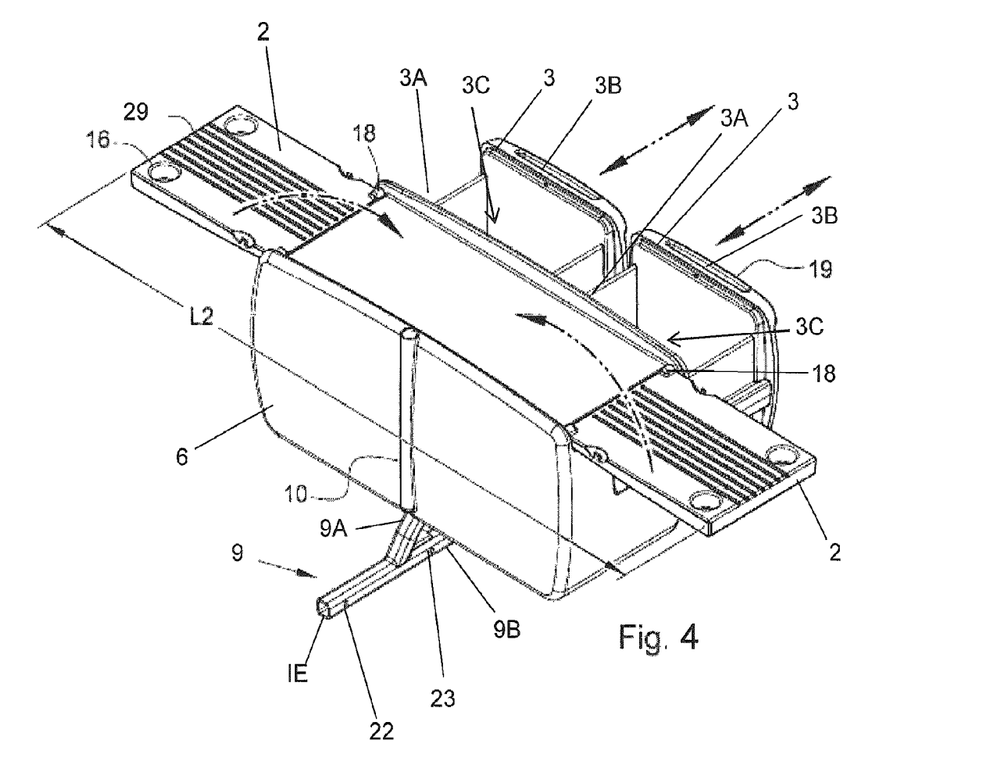
FIG. 4 illustrates a rear perspective view of the embodiment of the multifunctional cooler according to FIG. 3 with the embodiments of tabletop extensions unfolded and drawers in an opened position.

Referring to FIGS. 1 and 2, an embodiment of a multifunctional cooler 1 is provided according to the disclosure herein. As shown in FIG. 1, the multifunctional cooler 1 can also serve as a serving system with drawers 3 that can open and close and tabletop extensions 2 that can be unfolded and folded. The relative motion of the tabletop extensions 2 and drawers 3 are also shown in FIG. 4. The multifunctional cooler 1 can comprise a cooler body 6 having a top 6A, a bottom 6B, a first end wall 6C, a second end wall 6D, a front side wall 6E, and a back side wall 6E. The cooler body 6 can have two or more separate, isolated and thermally insulated drawer cavities 8A and 8B positioned within the cooler body 6 with each drawer cavity 8A, 8B having an opening on the front side wall 6E for receiving a drawer 3. The multifunctional cooler can also comprise drawers 3. Each drawer 3 can be movable from an open position to a closed position within the corresponding drawer cavity 8A, 8B. Each drawer 3 can also be removably insertable into the corresponding drawer cavity 8A, 8B in the front side wall 6E of the cooler body 6 as explained in more detail below. The multifunctional cooler 1 can also comprise at least one foldable tabletop extension 2 foldably secured to the top 6A of the cooler body 6. Each tabletop extension 2 can be movable between a closed position as shown in FIG. 2 and an unfolded position as shown in FIG. 4. When in an unfolded position, a surface 12 of the tabletop extension 2 can align with a surface 11 of the top 6A of the cooler body 6 to form a tabletop surface. The tabletop surface formed by the top surface 11 of the cooler body 6 and the surface 12 of tabletop extension 2 can have a longer length than a length of the cooler body 6. Hand-holds 19, 20 and 21 can be provided for manipulating and lifting the drawers 3, tabletop extensions 2, and/or multifunctional cooler 1.

For illustrating other various features, the embodiment of a multifunctional cooler 1 in FIG. 1 also shows an installed umbrella 7 (in phantom lines) in an integral umbrella tube 10, a cup in a beverage holder 16 in the surface 12 of one of the tabletop extensions 2, a plate on the surface 11 of the top 6A of the cooler body 6 forming the table surface, and a refuse bag on a hook 15 on one of the tabletop extension 2. The rear of the cooler body 6 can comprise a vertically extended tube 10 for holding the beach-style umbrella 7. For example, the integral vertically extended tube 10 for holding a beach-style umbrella can be affixed to the back side wall 6F of the cooler body 6 so that, when an umbrella 7 is insert therein, the umbrella 7 provides shade over the multifunctional cooler 1. Depending on the size of the umbrella 7, the shade can extend over the full tabletop surface of embodiments that include tabletop extensions 2. The extensions 2 also include beverage holders 16 for holding in place cups, bottles, cans, or the like and hooks 15 for hanging refuse bags, cooking and serving implements, and towels to name a few.

Figure 3:
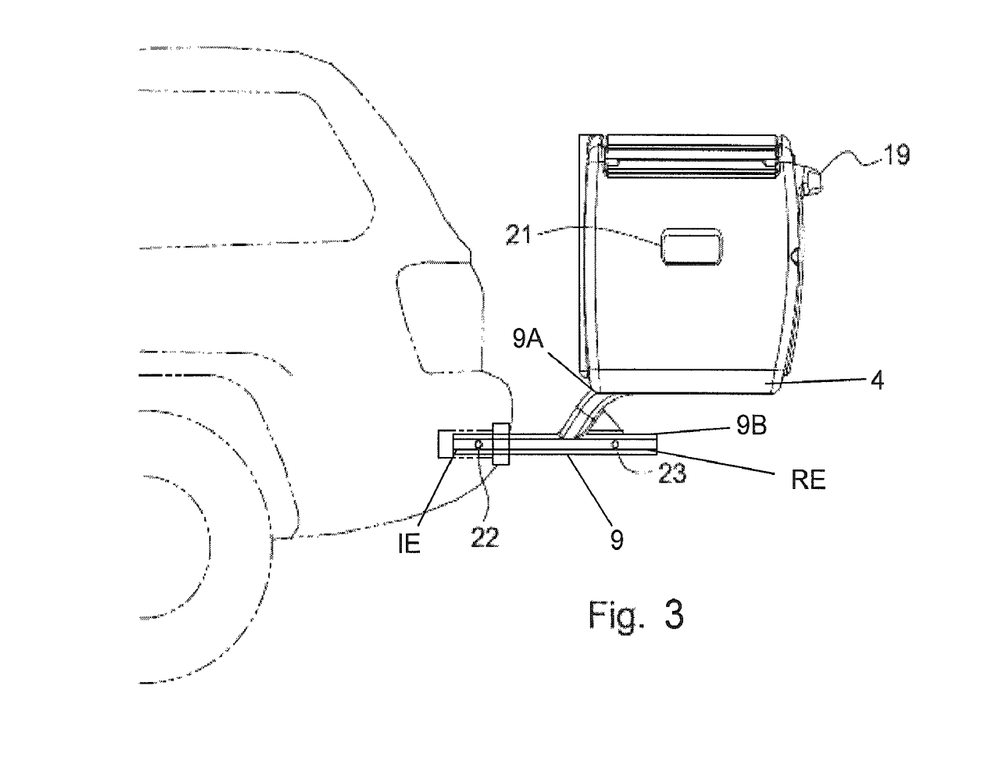
FIG. 3 illustrates a left side view of another embodiment of a multifunctional cooler secured to a vehicle according to the subject matter disclosed herein.

The top surface 11 of cooler body 6 can be uncovered when tabletop extensions 2 are unfolded. The top surface 11 of cooler body 6 can thereby act as a center portion of the table formed by the top 6A of the cooler body 6 and the tabletop extensions 2. For example, in some embodiments as shown in FIGS. 1-3, the multifunctional cooler 1 can comprise a first tabletop extension 2 and second tabletop extension 2. The first tabletop extension 2 can be hingeably attached proximal to a first end of the top 6A of the cooler body 6 at 18 while the second tabletop extension 2 can be hingeably attached proximal to a second end of the top 6A of the cooler body 6 also at 18 to allow the first and second tabletop extensions 2 to be folded and unfolded about a hinge attachment 18. In particular, the tabletop extensions 2 can be hinged at 18 at the top corners of the cooler body 6 as shown in FIG. 4. In this manner, each of the first and second tabletop extensions 2 can be movable between the closed, or folded, position as shown in FIG. 2 and the unfolded position as shown in FIGS. 1 and 4.

In the unfolded position, the table surface 12 of each of the first and second tabletop extensions 2 aligns with the surface 11 of the top 6A of the cooler body 6 to form a tabletop surface that has a length L2. When unfolded/open the table length L2 is effectively double a length L1 of the cooler body 6. The surfaces 12 of tabletop extensions 2 form the end portions of the table and include drainage grooves 29 to collect liquids and debris. The drainage grooves 29 can facilitate the draining of liquids from condensation and spills and other debris away from the items on the tabletop extensions 2.

One or more reflectors and/or light sources 14 can be positioned on the cooler body 6. The reflectors 14 can reflect light to help identify the presence of the cooler 1 even in the dark. The reflectors 14 can be an added safety feature on the multifunctional cooler 1, especially in embodiments that are securable to a hitch-mount 9 as described below. For example, two reflectors or light sources 14 can be positioned on the front side wall 6E of the cooler body 6 to reflect light from approaching vehicles. For instance, two or more reflectors and/or light sources 14 can be positioned on the front edges of the cooler body 6.

One or more locks 13 can be provided as means for locking the drawers 3 and/or tabletop extensions 2 to protect against theft and/or prevent from inadvertently coming open when the multifunctional cooler is transported. Such locks 13 can be latches that require the user to unlatch the latch to permit the opening of the respective drawers 3 and/or tabletop extensions 2. Alternatively, such locks 13 can be locking devices that require a key, such a physical key that can be inserted into the lock 13 or a combination that is to be entered into the lock 13 to unlock the lock 13. For example, a lock 13 can be mounted in the cooler body 6. Such a lock 13 that is mounted in the cooler body 6 can be configured to lock or hold both the drawers 3 and the tabletop extension 2 in a closed position. In some embodiments, one or more locks 13 can be mounted in the cooler body 6 with a lock 13 that locks or holds the drawers 3 in a closed position and a lock 13 that locks or holds the tabletop extensions 2 in a closed position. In some embodiments, a lock 13 can be mounted in the tabletop extensions 2 to lock or hold the tabletop extensions in a closed position. In some embodiments, a lock 13 can be mounted in the drawers 3 to lock or hold the drawers 3 in a closed position.

Figure 5:
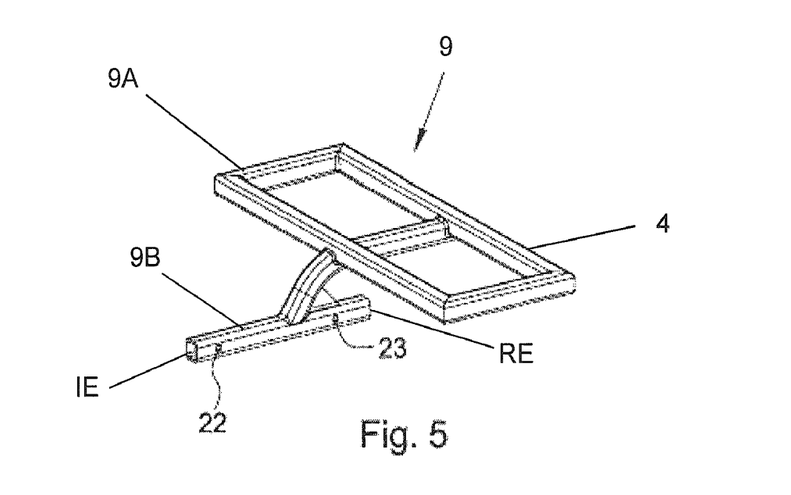
FIG. 5 illustrates a perspective view of an embodiment of a hitch-mount on which a cooler body of the embodiment of the multifunctional cooler according to FIG. 3 can be secured.

In some embodiments as shown in FIGS. 3-5, the multifunctional cooler 1 can comprise a hitch-mount 9 that includes a platform 4 on which the cooler body 6 can be secured. For example, similar to the embodiment described above, a multifunctional cooler 1 can comprise a cooler body 6. The cooler body 6 can have two or more separate, isolated and thermally insulated drawer cavities 8A, 8B positioned within the body 6 with each drawer cavity 8A, 8B having an opening on the front side wall for receiving a drawer 3. The multifunctional cooler 1 can also comprise a drawer 3 removably insertable into each drawer cavity 8A, 8B in the cooler body 6. Each drawer 3 can be movable from an open position to a closed position. In some embodiments, each drawer 3 can comprise a drawer body 3A and a drawer face 3B. The drawer body 3A can define a drawer well 3C therein that opens in a direction about perpendicular to a direction the respective drawer cavity 8A, 8B opens in which the drawer 3 resides. The drawer faces 3B can be disposed on a front side of the drawer bodies 3A, such that the drawer faces 3B can occupy at least a portion of the drawer cavity 3A in which the drawer 3 resides when the drawer 3 is in the closed position in the respective drawer cavity 8A, 8B.

The multifunctional cooler 1 can further comprise a hitch-mount 9 that can comprise an insertion end IE for inserting the hitch-mount 9 into a hitch on a vehicle and a platform 4 on which the cooler body 6 can be securable so that the front side wall 6A of the cooler body 6 faces away from the insertion end IE of the hitch-mount 9. While a particular embodiment of a hitch-mounted cooler is shown it is to be understood that the multifunctional cooler 1 may be used in other configurations and applications, such as mounted to the deck of a pickup truck, set on the ground or in any other application where storage and a working surface is required.

In some embodiments as shown in FIGS. 3-5, the hitch-mount 9 can comprise two levels with an upper level 9A that can include the platform 4 and a lower level 9B that can extend beneath the upper level 9A and can have a receiver end RE that is on the opposite end of the hitch mount 9 from the insertion end IE. The receiver end RE can be configured as a hitch that can permit the attachment of an additional hitch-mount, such as a ball mount, hitch ball, rack mount, or other attachment, below the upper level 9A. In some embodiments, the upper level 9A of the hitch-mount 9 can comprise the platform 4 and an arm that can extend up over the lower level 9B so that the platform 4 is at a height above the hitch at the receiver end RE to permit attachment of a trailer, rack, or another platform to an additional hitch-mount inserted in the hitch at the receiver end RE. In this manner, the multifunctional cooler 1 can be carried by the hitch of a vehicle while the vehicle is still capable of pulling a trailer or supporting another platform or rack as well. Two hitch pin holes 22 and 23 are provided in the hitch-mount 9 shown in FIGS. 3-5. The pin hole 22 is in the insertion end IE of the hitch-mount 9 for mounting the hitch-mount 9 to a motor vehicle and the hole 23 is in the receiver end RE of the hitch-mount 9 for securing a second platform to the hitch-mount 9 to hold additional items or for securing a trailer or the like thereto.

In some embodiments, the cooler body 6 can be attachable to and detachable from the platform 4 of the hitch-mount 9. In this manner, the multifunctional cooler 1 can be used away from the tailgate of a vehicle if desired. For example, the multifunctional cooler 1 can be transported to a specific location on the hitch mount 9 close to the desired location where the cooler 1 is intended to be used. The cooler 1 can then be removed from the hitch-mount 9 so that the multifunctional cooler 1 can be carried to the desired location of use. Such a feature allows for the hitch-mounted multifunctional cooler 1 to be transported to locations where a vehicle cannot reach or is prohibited from entering. In some embodiments, the cooler body 6 of the multifunctional cooler 1 can be permanently affixed to the platform 4 of the hitch-mount 9.

Figures 7, 8:
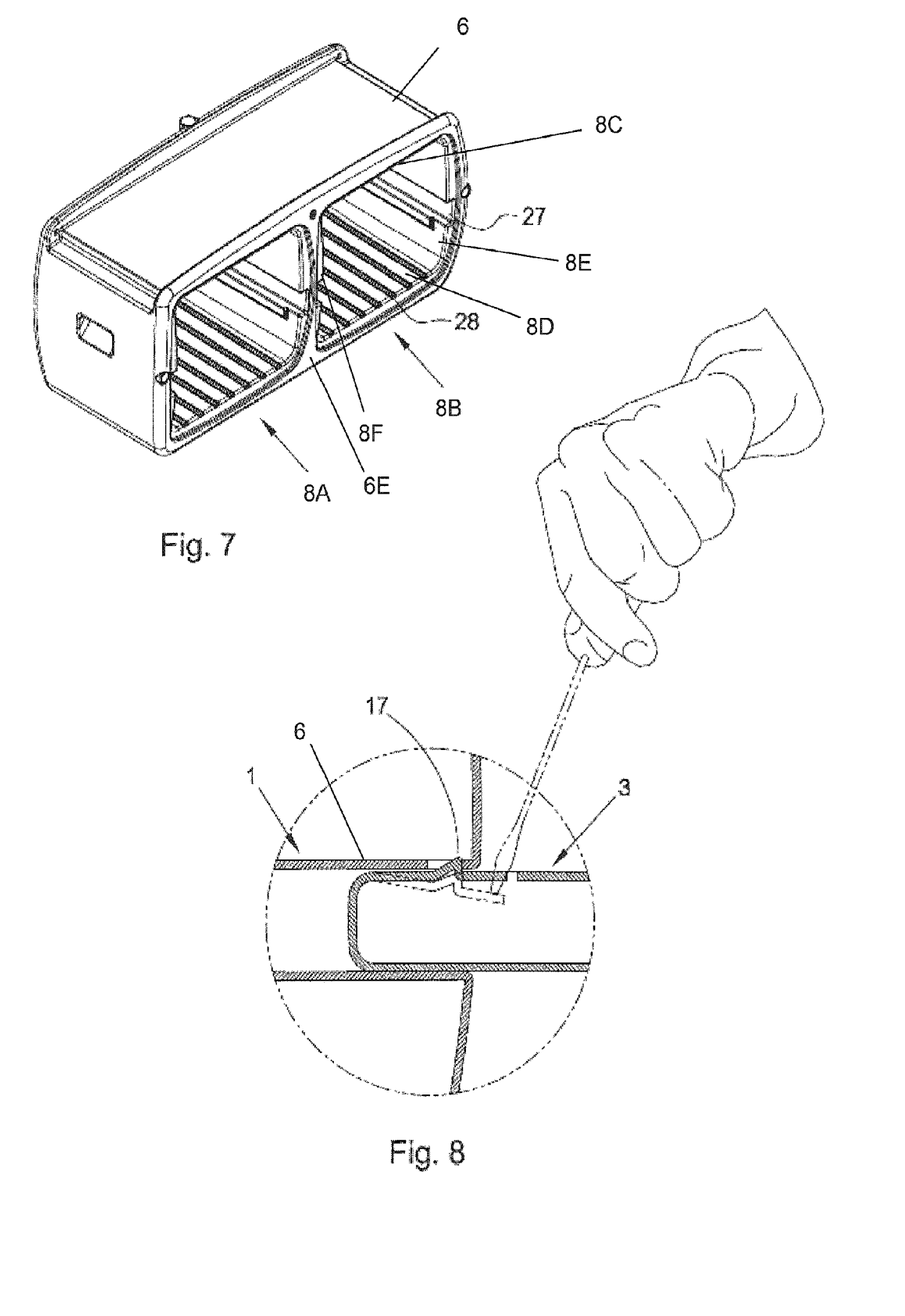
FIG. 7 illustrates a perspective view of an embodiment of a cooler body of an embodiment of a multifunctional cooler according to the subject matter disclosed herein showing drawer rail slots and drainage grooves.
FIG. 8 illustrates a partial cross-sectional view of an embodiment of a multifunctional cooler according to the subject matter disclosed herein showing an embodiment of a drawer retaining clip and method for unlatching the retainer clip.

In some embodiments, the cooler body 6 can comprise an upper inner wall 8C, a lower inner wall 8D, an outward inner wall 8E and an inward inner wall 8F for each drawer cavity 8A, 8B as shown in FIG. 7. The inner walls 8C, 8D, 8E, 8F define the drawer cavities 8A, 8B. In some such embodiments, the multifunctional cooler 1 can comprise drainage grooves 28 along each of the lower inner walls 8D of the cooler body 6 to facilitate drainage of fluids from each respective drawer cavity 8A, 8B. Such drainage grooves 28 are positioned beneath the drawers 3 so that they can facilitate drainage of water from melting ice that may be placed inside the drawers 3 to keep the contents in the respective drawer 3 cold. In some embodiments, the drainage grooves 28 are gradually sloped downward from a back portion of the lower inner walls 8D toward the front side wall 6A of the cooler body 6.

Figures 6, 6A:
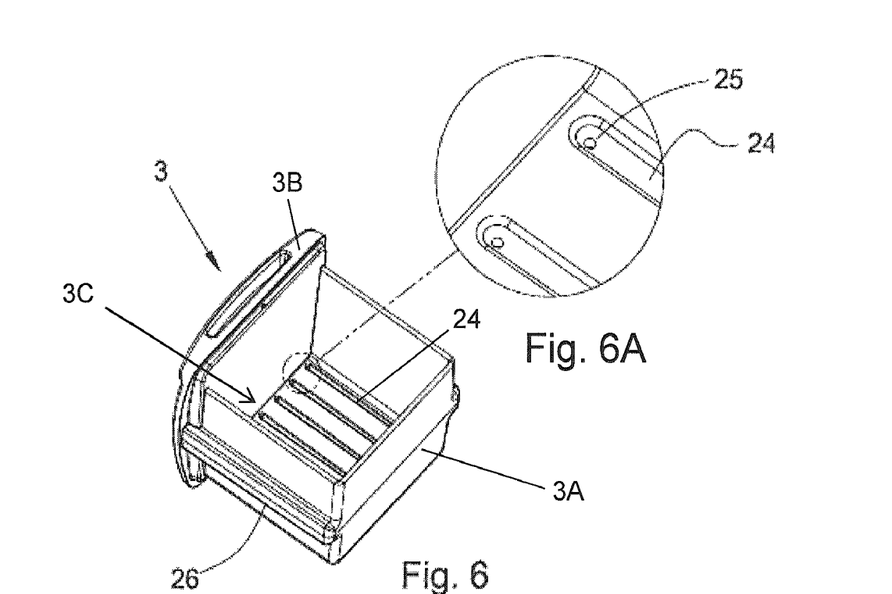
FIG. 6 illustrates a perspective view of an embodiment of a drawer for an embodiment of a multifunctional cooler according to the subject matter disclosed herein showing embodiments of drainage grooves.
FIG. 6A illustrates a detailed perspective view of a portion of a bottom of the drawer of the embodiment of the multifunctional cooler according to FIG. 6 showing a close-up of the embodiments of the drainage grooves with drainage holes.

To further facilitate drainage of liquid, the drawer body 3A of the multifunctional cooler 1 can also comprise a series of drainage grooves 24 as shown in FIGS. 6 and 6A. The drainage grooves 24 along a bottom portion of the drawer body 3A for directing the flow of liquid within the drawer 3. For example, the drainage grooves 24 can be along a bottom of the drawer well 3C. The drawer body 3A of the drawer 3 can further comprise drainage holes 25 within the drainage grooves 24 to facilitate drainage of liquid from the drainage grooves 24 in the drawer body 3A. The drainage grooves 24 in the drawers 3 can be gradually sloped downward toward the drainage holes 25 therein to facilitate drainage of liquid from the drawer 3.

Further, the drainage holes 25 shown in FIG. 6A can allow liquids to drain out of drawer 3 and into each respective drawer cavity 8A, 8B in the cooler body 6 and then drain out via the drainage grooves 28 in the cooler body 6 shown in FIG. 7. In particular, the drainage holes 25 in the drawers 3 can be aligned with the drainage grooves 28 in the lower inner walls 8D of the cooler body 6 to facilitate drainage of liquid from the cooler body 6. In this manner, water from melting ice that may be placed inside the drawers 3 to keep the contents in the drawer 3 cold can be drained from the drawers 3 and into the cooler body 6 where the water can drain down the grooves 28 in the bottom inner walls 8D of the cooler body 6 and out of the cooler body 6 along the front side wall 6E of the cooler body 1 at the bottom edge of the drawers 3. Thereby, the items placed in the drawers 3 with the ice to be kept cold do not sit in melted water. In such a manner, the items can be kept dryer longer and the items can be kept colder longer by prolonging the ice in its solid state, since ice in water melts faster than ice in air.

Holes are not made in the grooves 28 of the cooler body 6 that go to the outside. The reason is that a draft coming in through such holes in the cooler body 6 and generating airflow inside the cooler is undesirable. Such airflow can also cause the ice to melt faster. So, in this way, the holes are in the drawers 3 and the water drains into a closed cavity and then trickles out through the edge between the cooler body 6 and the drawer 3. This minimizes convection within the drawers 3.

Shown in FIG. 6, in some embodiments, the drawer 3 can include one or more drawer rails 26. As shown in FIG. 7, each drawer cavity 8A, 8B can have rail slots 27 in which the drawer rails 26 ride. The rail slots 27 correspond to the drawer rails 26 so that the rail slots 27 receive the drawer rails 26 for aligning each drawer 3 within the respective drawer cavity 8A, 8B and to reduce movement of the drawer 3 within the drawer cavity 8A, 8B when the drawer 3 is in a closed position. For example, in some embodiments, at least one of the outward inner walls 8E and the inward inner walls 8F of the cooler body 6 can comprise a rail slot 27 for receiving a corresponding drawer rail 26 on a drawer 3. Further, the drawers 3 can be secured in the cooler body 6 by one or more retainer clips 17 as shown in FIG. 8 to prevent the drawer 3 from being fully removed inadvertently. The retainer clips 17 can be unlatched as shown in FIG. 8 to allow removal of drawers 3 for cleaning. For example, each drawer 3 of the multifunctional cooler 1 can comprise a retainer clip 17 on at least one drawer rail 26 to prevent inadvertent removal of the drawer 3 from the respective drawer cavity 8A, 8B when the drawer 3 is moved to the open position. The retainer clips 17 can be engaged with and disengaged from the cooler body 6 to allow removal of the respective drawer 3 from the respective drawer cavity 8A, 8B.

Thus, as disclosed herein, a multifunctional cooler can be provided that comprises a cooler body having a top, a bottom, a first end wall, a second end wall, a front side wall, and a back side wall. The body can have two or more separate, isolated and thermally insulated drawer cavities positioned within the body with each drawer cavity having an opening on the front side wall for receiving a drawer. The multifunctional cooler can also comprise a drawer removably insertable into each drawer cavity in the front side wall. Each drawer can be movable from an open position to a closed position. In some embodiments, each drawer can comprise a drawer body and a drawer face. The drawer body can define a drawer well therein that opens in a direction about perpendicular to a direction the drawer cavity opens in which the drawer resides. The drawer face can be disposed on a front side of the drawer body, such that the drawer faces occupies at least a portion of the drawer cavity in which the drawer resides when the drawer is in the closed position in the respective drawer cavity.

The multifunctional cooler can also comprise at least one foldable tabletop extension foldably secured to the top of the cooler body. The tabletop extension can be movable between a closed position and an unfolded position. When in an unfolded position, a surface of the tabletop extension can align with a surface of the top of the cooler body to form a tabletop surface. The tabletop surface formed by the top surface of the cooler body and the tabletop extension can have a longer length than a length of the cooler body.

For example, in some embodiments, the multifunctional cooler can comprise a first tabletop extension and second tabletop extension. The first tabletop extension can be hingeably attached proximal to a first end of the top of the cooler body while the second tabletop extension can be hingeably attached proximal to a second end of the top of the cooler body to allow the first and second tabletop extensions to be folded and unfolded about a hinge attachment. In this manner, each of the first and second tabletop extensions can be movable between the closed position and the unfolded position. In the unfolded position, a table surface of each of the first and second tabletop extensions aligns with a surface of the top of the cooler body to form a tabletop surface that has a length that is effectively double the length of the cooler body.

In some embodiments, the tabletop extensions can comprise grooves to facilitate drainage of liquids from condensation and spills and other debris away from the items placed on the at least one tabletop extension. In some embodiments, the tabletop extensions can comprise integral beverage holders. Additionally, in some embodiments, the tabletop extensions can comprise hand-holds to allow easy opening of the at least one tabletop extension. Such hand-holds can be on the surface of the tabletop extension opposite the table surface. Further, the tabletop extensions can comprise one or more integral hooks for hanging various items. For example, the hooks can be on a side of each tabletop extension.

In some embodiments, the multifunctional cooler can comprise one or more locks to facilitate the locking of the drawers and/or the tabletop extensions in a closed position. Such locks can be latches that require the user to unlatch the latch to permit the opening of the respective drawers and/or tabletop extensions. Alternatively, such locks can be locking devices that require a key, such a physical key that can be inserted into the lock or a combination that is to be entered into the lock to unlock the lock. For example, a lock can be mounted in the cooler body. Such a lock that is mounted in the cooler body can be configured to lock or hold both the drawers and the tabletop extension in a closed position. In some embodiments, one or more locks can be mounted in the cooler body with a lock that locks or holds the drawers in a closed position and a lock that locks or holds the tabletop extensions in a closed position. In some embodiments, a lock can be mounted in the tabletop extensions to lock or hold the tabletop extensions in a closed position. In some embodiments, a lock can be mounted in the drawers to lock or hold the drawers in a closed position.

In some embodiments, the cooler body can comprise an upper inner wall, a lower inner wall, an outward inner wall and an inward inner wall for each drawer cavity, the inner walls defining the drawer cavities. In some such embodiments, the multifunctional cooler can comprise drainage grooves along each of the lower inner walls of the cooler body to facilitate drainage of fluids from each respective drawer cavity. Such drainage grooves are positioned beneath the drawers so that they can facilitate drainage of water from melting ice that may be placed inside the drawers to keep the contents in the drawer cold. In some embodiments, the drainage grooves are gradually sloped downward from a back portion of the lower inner walls toward the front side wall of the cooler body.

To further facilitate drainage of liquid, the drawer of the multifunctional cooler can comprise drainage grooves along a bottom portion of the drawer for directing the flow of liquid within the drawer. For example, the drainage grooves can be along a bottom of the drawer well. The drawer of the multifunctional cooler can further comprise drainage holes within the drainage grooves to facilitate drainage of liquid from the drainage grooves in the drawer. The drainage grooves in the drawers can be gradually sloped downward toward the drainage holes therein to facilitate drainage of liquid from the drawer. Further, the drainage holes in the drawers can be aligned with the drainage grooves in the lower inner walls of the cooler body to facilitate drainage of liquid from the cooler body. In this manner, water from melting ice that may be placed inside the drawers to keep the contents in the drawer cold can be drained from the drawers and into the cooler where the water can drain down the grooves in the bottom inner walls of the cooler body and out of the cooler body along the front side wall of the cooler body at the bottom edge of the drawers. Thereby, the items placed in the drawers with the ice to be kept cold do not sit in melted water. In such a manner, the items can be kept dryer longer and the items can be kept colder longer by prolonging the ice in its solid state, since ice in water melts faster than ice in air.

In some embodiments, the drawer of the multifunctional cooler can comprise one or more drawer rails. Further the cooler body can form corresponding rail slots for receiving the drawer rails for aligning each drawer within the respective drawer cavity and to reduce movement of the drawer within the drawer cavity when the drawer is in a closed position. For example, at least one of the outward inner walls and the inward inner walls of the cooler body can comprise a rail slot for receiving a corresponding drawer rail for aligning each drawer within the respective drawer cavity and to reduce movement of the drawer within the drawer cavity when the drawer is in a closed position. Further, each drawer of the multifunctional cooler can comprise a retainer clip to prevent inadvertent removal of the drawer from the respective drawer cavity when the drawer is moved to the open position. For example, each drawer of the multifunctional cooler can comprise a retainer clip on at least one drawer rail to prevent inadvertent removal of the drawer from the respective drawer cavity when the drawer is moved to the open position. The retainer clips can engage with and disengage from the cooler body to allow removal of the respective drawer from the respective drawer cavity.

In some embodiments, the multifunctional cooler can comprise an integral vertically extended tube for holding a beach-style umbrella. For example, integral vertically extended tube for holding a beach-style umbrella can be affixed to the back side wall of the cooler body so that the when an umbrella is insert therein, the umbrella provides shade over the multifunctional cooler. Depending on the size of the umbrella, the shade can extend on the full tabletop surface of embodiments that include tabletop extensions.

In some embodiments, the multifunctional cooler can comprise one or more reflectors positioned on an exterior of the cooler body. The reflectors can reflect light to help identify the presence of the cooler even in the dark. The reflectors can be an added safety feature on the multifunctional cooler, especially in embodiments that are securable to a hitch-mount as described below. For example, two reflectors can be positioned on the front side wall of the cooler body to reflect light from approaching vehicles.

In some embodiments, as mentioned above, the multifunctional cooler can comprise a hitch-mount that includes a platform on which the cooler body is securable. For example, a multifunctional cooler can comprise a cooler body having a top, a bottom, a first end wall, a second end wall, a front side wall, and a back side wall. The body can have two or more separate, isolated and thermally insulated drawer cavities positioned within the body with each drawer cavity having an opening on the front side wall for receiving a drawer. The multifunctional cooler can also comprise a drawer removably insertable into each drawer cavity in the front side wall. Each drawer can be movable from an open position to a closed position. In some such embodiments, each drawer can comprise a drawer body and a drawer face. The drawer body can define a drawer well therein that opens in a direction about perpendicular to a direction the drawer cavity opens in which the drawer resides. The drawer face can be disposed on a front side of the drawer body, such that the drawer faces occupies at least a portion of the drawer cavity in which the drawer resides when the drawer is in the closed position in the respective drawer cavity. The multifunctional cooler can further comprise a hitch-mount that can comprise an insertion end for inserting the hitch-mount into a hitch on a vehicle and a platform on which the cooler body can be securable so that the front side wall faces away from the insertion end of the hitch-mount.

In some embodiments, the hitch-mount can comprise two levels with an upper level that can include the platform and a lower level that can extend beneath the upper level and can have a receiver end that is on the opposite end of the hitch mount from the insertion end. The receiver end can be configured as a hitch that can permit the attachment of an additional hitch-mount below the upper level. In some embodiments, the upper level of the hitch-mount can comprise the platform and an arm that can extend upward from the hitch mount so that the platform is at a height above the hitch at the receiver end to permit attachment of a trailer to a ball mount, hitch ball, rack mount or other attachment inserted in the hitch at the receiver end. In this manner, the multifunctional cooler can be carried by the hitch of a vehicle while the vehicle is still capable of pulling a trailer or carrying a rack as well.

In some embodiments, the cooler body can be attachable to and detachable from the platform of the hitch-mount. In this manner, the multifunctional cooler can be used away from the tailgate of a vehicle if desired. Such a feature allows for the hitch-mounted multifunctional cooler to be transported to locations where a vehicle cannot reach or is prohibited from entering. In other embodiments, the cooler body of the multifunctional cooler can be permanently affixed to the platform of the hitch-mount. The hitch-mounted multifunctional cooler can also have the same or similar features as the multifunctional cooler described above.

Embodiments of the present disclosure shown in the Figures and described above are exemplary of numerous embodiments that can be made within the scope of the present subject matter. It is contemplated that the configurations of the multifunctional coolers and related methods can comprise numerous configurations other than those specifically disclosed. Thus, the scope of the present subject matter in this disclosure and the appended claims should be interpreted broadly.

What is claimed is:

1. A multifunctional cooler comprising:
a cooler body comprising a top, a bottom, a first end wall, a second end wall, a front side wall, and a back side wall, the body having at least two or more separate, isolated and thermally insulated drawer cavities positioned within the body with each drawer cavity having an opening on the front side wall and the cooler body comprising an upper inner wall, a lower inner wall, an outward inner wall and an inward inner wall for each drawer cavity with the inner walls defining the drawer cavities;
drainage grooves configured along each of the lower inner walls of the cooler body to facilitate drainage of fluids from each respective drawer cavity; and
a drawer removably insertable into each drawer cavity in the front side wall, each drawer being movable from an open position to a closed position.

2. The cooler according to claim 1, further comprising at least one foldable tabletop extension foldably secured to the top of the cooler body, the tabletop extension being movable between a closed position and an unfolded position with a surface of the tabletop extension aligning with a surface of the top of the cooler body to form a tabletop surface when the at least one tabletop extension is in the unfolded position.

3. The cooler according to claim 2, further comprising one or more locks to facilitate the locking of at least one of the drawers or the tabletop extension in a closed position.

4. The cooler according to claim 1, further comprising first and second tabletop extensions, with the first tabletop extension hingeably attached proximal to a first end of the top of the cooler body and the second tabletop extension hingeably attached proximal to a second end of the top of the cooler body so that each of the first and second tabletop extensions are movable between a horizontal closed position and the unfolded position with a table surface of each of the first and second tabletop extensions aligning with a surface of the top of the cooler body to form a tabletop surface that has a length that is effectively double a length of the cooler body.

5. The cooler according to claim 1, wherein each of the drawers further comprises drainage grooves along a bottom portion of the drawer for directing the flow of liquid within the drawer.

6. The cooler according to claim 1, wherein the drawer further comprises drainage holes within the drainage grooves to facilitate drainage of liquid from the drainage grooves in the drawer.

7. The cooler according to claim 6, wherein the drainage holes in the drawers are aligned with the drainage grooves in the lower inner walls of the cooler body to facilitate drainage of liquid from the cooler body.

8. The cooler according to claim 7, wherein the drainage grooves along each of the lower inner walls of the cooler body are beneath the drawers to facilitate drainage of water from melting ice from inside the drawers.

9. The cooler according to claim 1, wherein each of the drawers comprises at least one drawer rail and at least one of the outward inner walls and the inward inner walls comprise a rail slot for receiving the drawer rail for aligning each drawer within the respective drawer cavity and to reduce movement of the drawer within the drawer cavity when the drawer is in a closed position.

10. The cooler according to claim 1, further comprising a hitch-mount that includes a platform on which the cooler body is securable.

11. The cooler according to claim 10, wherein the cooler body is attachable to and detachable from the platform of the hitch-mount.

12. The cooler according to claim 1, wherein the drainage grooves in the drawers are gradually sloped downward toward the drainage holes therein to facilitate drainage of liquid from the drawer.

13. The cooler according to claim 1, wherein the drainage grooves are gradually sloped downward from a back portion of the lower inner walls toward the front side wall of the cooler body.

14. A multifunctional cooler comprising:
a cooler body having a top, a bottom, a first end wall, a second end wall, a front side wall, and a back side wall, the body having at least two or more separate, isolated and thermally insulated drawer cavities positioned within the body with each drawer cavity having an opening on the front side wall; and
a drawer removably insertable into each drawer cavity in the front side wall, each drawer being movable from an open position to a closed position; and
a hitch-mount that comprises an upper level that includes a platform on which the cooler body is securable and a lower level that serves as a receiver that extends the hitch and permits the attachment of an additional hitch-mount below the upper level.

15. A cooler comprising:
a cooler body having a top, a bottom, a first end wall, a second end wall, a front side wall, and a back side wall, the body having at least two or more separate, isolated and thermally insulated drawer cavities positioned within the body with each drawer cavity having an opening on the front side wall;
a drawer removably insertable into each drawer cavity in the front side wall, each drawer being movable from an open position to a closed position;
a hitch-mount comprising an insertion end for inserting into a hitch on a vehicle and a platform on which the cooler body is securable so that the front side wall faces away from the insertion end of the hitch-mount; and
the hitch-mount further comprising two levels with an upper level that includes the platform and a lower level that extends beneath the upper level and has a receiver end opposite of the insertion end that is configured as a hitch that permits the attachment of an additional hitch-mount below the upper level.

16. The cooler according to claim 15, wherein the upper level of the hitch-mount comprises the platform and an arm that extends upward from the hitch mount so that the platform is at a height above the hitch at the receiver end to permit attachment of a trailer to an additional hitch-mount inserted in the hitch at the receiver end.

17. The cooler according to claim 15, further comprising first and second tabletop extensions, with the first tabletop extension hingeably attached proximal to a first end of the top of the cooler body and the second tabletop extension hingeably attached proximal to a second end of the top of the cooler body so that each of the first and second tabletop extensions are movable between the closed position and the unfolded position with a table surface of each of the first and second tabletop extensions aligning with a surface of the top of the cooler body to form a tabletop surface that has a length that is effectively double a length of the cooler body.

18. The cooler according to claim 15, further comprising drainage grooves along lower inner walls of the cooler body that form the bottom portion of the drawer cavities to facilitate drainage of fluids from each respective drawer cavity.

19. The cooler according to claim 18, wherein each of the drawers further comprises drainage grooves along a bottom portion of the drawer for directing the flow of liquid within the drawer and drainage holes within the drainage grooves to facilitate drainage of liquid from the drainage grooves in the drawer, the drainage holes in the drawers being alignable with the drainage grooves in the lower inner walls of the cooler body to facilitate drainage of liquid from the cooler body.

20. The cooler according to claim 15, further comprising at least one foldable tabletop extension foldably secured to the top of the cooler body, the tabletop extension being movable between a horizontal closed position and an unfolded position with a surface of the tabletop extension aligning with a surface of the top of the cooler body to form a tabletop surface when the at least one tabletop extension is in the unfolded position.

\* \* \* \* \*